United States Patent
Sidi, et al.

[11] 3,905,928
[45] Sept. 16, 1975

[54] SURFACE-COATING COMPOSITIONS CONTAINING SUBSTITUTED OXAZOLIDINES

[75] Inventors: Henri Sidi, Paramus; and Hilding R. Johnson, Wayne, both of N.J.

[73] Assignee: Tenneco Chemicals, Inc., Saddle Brook, N.J.

[22] Filed: Feb. 15, 1974

[21] Appl. No.: 443,044

[52] U.S. Cl.............. 260/29.6 MN, 106/15 AF, 260/22 R, 260/29.7 N, 260/45.8 NZ
[51] Int. Cl.²................................ C09D 5/14
[58] Field of Search.......... 260/29.6 MN, 307 F; 106/15 AF; 260/45.8 NZ, 29.7 N, 22 R, 260/30.4 R, 30.4 A, 30.2; 424/272

[56] References Cited
UNITED STATES PATENTS

| | | | |
|---|---|---|---|
| 3,824,309 | 7/1974 | Schuegelberger et al. | 424/272 |
| 3,065,130 | 11/1962 | Walles | 106/15 |
| 3,322,621 | 5/1967 | Shibe Jr. et al. | 106/15 |
| 3,769,295 | 10/1973 | Hoyle et al. | 260/307 |
| 2,714,082 | 7/1955 | Davies et al. | 260/307 |
| 3,423,349 | 1/1969 | Gagliardi | 260/29.6 |
| 3,809,755 | 5/1974 | Crank | 260/307 |

FOREIGN PATENTS OR APPLICATIONS

1,585,631  1/1970  France

*Primary Examiner* — Eugene C. Rzucidlo
*Attorney, Agent, or Firm* — Evelyn Berlow

[57] ABSTRACT

Surface-coating compositions that have improved resistance to attack by bacteria and fungi contain 0.10 percent to 3.0 percent by weight of a biocidal component selected from the group consisting of (a) compounds having the structural formula

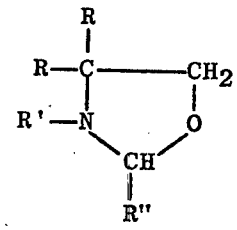

b. compounds having the structural formula

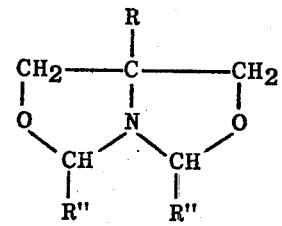

c. compounds having the structural formula

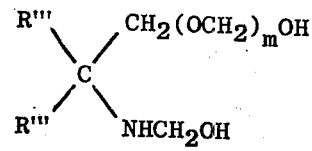

wherein each R represents alkyl of 1 to 6 carbon atoms, hydroxymethyl, or hydroxymethoxymethyl; R' represents hydrogen, alkyl of 1 to 6 carbon atoms, phenyl, halophenyl, or hydroxymethyl; R'' represents hydrogen, alkyl of 1 to 6 carbon atoms, chloroalkyl of 1 to 4 carbon atoms, phenyl, halophenyl, hydroxymethyl, or —(CH$_2$)$_n$CHO; each R''' represents alkyl of 1 to 6 carbon atoms; m represents 0 or 1; and n represents 0 to 3; and
(d) mixture of said compounds.

17 Claims, No Drawing Figures

SURFACE-COATING COMPOSITIONS CONTAINING SUBSTITUTED OXAZOLIDINES

This invention relates to surface-coating compositions that have improved resistance to deterioration resulting from attack by bacteria, fungi, and other microorganisms. More particularly, it relates to surface-coating compositions that contain a biocidally-effective amount of a substituted oxazolidine.

It is well known in the art that paints and varnishes often have inadequate resistance to the action of microorganisms. Some of these coating compositions, such as enamels and house paints, contain as their resinous binders drying oils, oleoresinous varnishes, or alkyd resins, which are subject to attack by fungi and bacteria. Others, for example, aqueous dispersions of water-insoluble synthetic linear polymers, generally contain as plasticizers and thickeners materials that have their origin in animal or vegetable sources and that render the compositions susceptible to mildew. The resulting deterioration of the surface-coating compositions seriously hinders their full scale utilization, particularly in those areas and in those applications that are conducive to such attack.

Various biocidal materials have been suggested for use in surface-coating compositions, but none has proven entirely satisfactory in this application. Some do not provide the required prolonged protection against attack by microorganisms, while others undergo sulfide staining and still others hydrolyze in alkaline aqueous paint systems or separate from the applied coating by migration, volatilization, or leaching once the coating has been spread in a thin layer over the surface to be protected.

This invention relates to biocides that are of particular value in surface-coating compositions. These biocides, which are thoroughly compatible with the resinous binders that commonly are used in surface-coating compositions and which are resistant to sulfide staining, provide excellent and prolonged resistance to deterioration resulting from attack by bacteria, fungi, and other microorganisms without adversely affecting the color, pH, viscosity, and other physical properties of the surface-coating compositions.

The biocidal compounds that are used in the surface-coating compositions of this invention include a. compounds having the structural formula

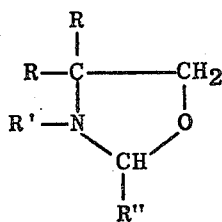

b. compounds having the structural formula

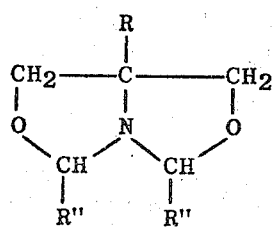

c. compounds having the structural formula

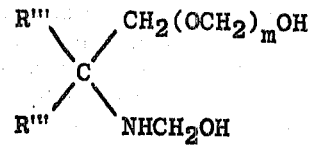

wherein each R represents alkyl of 1 to 6 carbon atoms, hydroxymethyl, or hydroxymethoxymethyl; R' represents hydrogen, alkyl of 1 to 6 carbon atoms, phenyl, chlorophenyl, bromophenyl, iodophenyl, or hydroxymethyl; each R'' represents hydrogen, alkyl of 1 to 6 carbon atoms, chloroalkyl of 1 to 4 carbon atoms, phenyl, chlorophenyl, bromophenyl, iodophenyl, hydroxymethyl, or $-(CH_2)_nCHO$; each R''' represents alkyl of 1 to 6 carbon atoms; m represents 0 or 1; and n represents 0 to 3; and d. mixtures of these compounds.

Examples of the monocyclic biocidal compounds include 4,4-dimethyloxazolidine, 4-methyl-4-hexyloxazolidine, 4,4-di-tert.-butyloxazolidine, 4-methyl-4-hydroxymethyloxazolidine, 4,4-di(hydroxymethyl)-oxazolidine, 3-hydroxymethyl-4,4-dimethyloxazolidine, 3-methyl-4,4-diethyloxazolidine, 3-phenyl-4-methyl-4-hydroxymethyloxazolidine, 3-p-chlorophenyl-4,4-diisopropyloxazolidine, 2-methyl-3-tert.-butyl-4,4-di(hydroxymethyl)oxazolidine, 2-formyl-4,4-dimethyloxazolidine, 2-(α-chloroethyl)-4,4-dimethyloxazolidine, 2-phenyl-4-methyl-4-hydroxymethyloxazolidine, 2-p-chlorophenyl-4-methyl-4-hydroxymethyloxazolidine, and 2-(2,4-dichlorophenyl)-4,4-dipropyloxazolidine. Examples of the bicyclic oxazolidines include the following: 5-methyl-1-aza-3,7-dioxabicyclo(3,3,0)octane, 5-(2-ethylbutyl)-1-aza-3,7-dioxabicyclo(3,3,0)octane, 5-hydroxymethyl-1-aza-3,7-dioxabicyclo(3,3,0)octane, 5-hydroxymethoxymethyl-1-aza-3,7-dioxabicyclo(3,3,0)octane, 2,5-bis(hydroxymethyl)-1-aza-3,7-dioxabicyclo(3,3,0)octane, 2-phenyl-5-hydroxymethyl-1-aza-3,7-dioxabicyclo(3,3,0)octane, 2-(α-chloroethyl)-5-methyl-1-aza-3,7-dioxabicyclo(3,3,0)octane, 2,8-bis(2-ethylbutyl)-5-methyl-1-aza-3,7-dioxabicyclo(3,3,0)octane, 2-phenyl-5-ethyl-1-aza-3,7-dioxabicyclo(3,3,0)octane, 2,8-bis(2,6-dichlorophenyl)-5-isopropyl-1-aza-3,7-dioxabicyclo(3,-3,0)octane, 2-formyl-5-ethyl-1-aza-3,7-dioxabicyclo(3,3,0)octane, 2,5,8-trimethyl-1-aza-3,7-dioxabicyclo(3,3,0)octane, and 2,8-diethyl-5-hydroxymethyl-1-aza-3,7-dioxabicyclo(3,3,0)octane. Illustrative of the acyclic compounds are 2-(N-hydroxymethylamino)-2-methylpropanol-1-hemiformal, 2-(N-hydroxymethylamino)-2-ethylbutanol-1, 2-(N-hydroxymethylamino)-2-hexyloctanol-1-hemiformal, 2-(N-hydroxymethylamino)-2-ethyloctanol-1-, and 2-(N-hydroxymethylamino)-2-methylhexanol-1.

The biocidal compounds of this invention may be prepared by the reaction of an aminoalcohol with an aldehyde at a temperature between about 20°C. and 100°C. The reaction is preferably carried out in aqueous solution at ambient temperature. Illustrative of the aminoalcohols that can be used in the reaction are 2-amino-2-methylpropanol-1, 2-amino-2-methyl-1,3-propanediol, 2-amino-2-ethyl-1,3-propanediol, and tris(hydroxymethyl)aminomethane. The aldehyde may be an aliphatic aldehyde, such as formaldehyde, acetaldehyde, butyraldehyde, α-chloroacetaldehyde, or 2-ethylbutyraldehyde; an aromatic aldehyde, such as benzaldehyde, p-chlorobenzaldehyde, or 2,4-dichlorobenzaldehyde; or a dialdehyde, such as glyoxal, succinaldehyde, or glutaraldehyde. A single aldehyde or a mixture of aldehydes may be used. If desired, the oxazolidine may be separated from the reaction mixture and purified by known techniques.

The aminoalcohol is preferably mixed with an aqueous solution that contains formaldehyde and optionally another aldehyde at ambient temperature to form an aqueous solution that contains 20 percent to 80 percent by weight, and preferably 40 percent to 60 percent by weight, of one or more of the aforementioned substituted oxazolidines. The aqueous solution may then be used without purification or additional treatment other than adjustment of the concentration of the reaction product to the desired level to protect surface-coating compositions from attack by bacteria and fungi. In addition to costing less than the purified oxazolidines and being easier to incorporate in the aqueous surface-coating compositions, the aqueous oxazolidine solutions provide better biocidal activity for a given concentration of the oxazolidine in the surface-coating composition.

The oxazolidines of this invention can be used to impart bacterial and fungal resistance to a wide variety of surface-coating compositions including both water-based and organic solvent-based coating systems.

In a preferred embodiment of the invention, the oxazolidines are used as the biocide in aqueous surface-coating compositions that contain about 10 percent to 60 percent by weight of a water-insoluble, film-forming resinous binder that is an oleoresinous binder, a synthetic linear addition polymer, or a mixture of these binders. The useful aqueous dispersions of synthetic linear addition polymers are ordinarily prepared by the emulsion polymerization of ethylenically-unsaturated monomers. Illustrative of these polymers are polyvinyl acetate; polyvinyl butyrate; polyvinyl chloride; copolymers of vinyl acetate with vinyl chloride or acrylonitrile; copolymers of vinyl chloride with vinylidene chloride; polyethylene; polyisobutylene; polystyrene; copolymers of styrene with maleic anhydride or butadiene; copolymers of acrylonitrile with butadiene; copolymers of methacrylic acid esters of alcohols having 1 to 8 carbon atoms with vinyl acetate, vinyl chloride, acrylonitrile, or styrene; copolymers of acrylic acid esters of alcohols having 1 to 8 carbon atoms with vinyl acetate, vinyl chloride, acrylonitrile, or styrene; and mixtures thereof. Suitable oleoresinous binders include drying oils, such as linseed oil, tung oil, soybean oil, dehydrated castor oil, safflower oil, or fish oil; bodied drying oils; blends of drying oils or bodied drying oils with a resin component such as limed rosin, an ester gum, or phenolic resin; oleoresinous varnishes formed by heating one of the aforementioned resins with one or more drying oils or bodied drying oils; alkyd resins, which are resinous products resulting from the reaction of a polyhydric alcohol, such as pentaerythritol or glycerol, with a dicarboxylic acid, such as phthalic anhydride, and fatty acids; and mixtures thereof.

The oxazolidines can also be used as the biocide in organic solvent-based systems that contain an oleoresinous binder as hereinbefore defined.

The addition to surface-coating compositions of as little as 0.10 percent by weight of one or more of the biocidal compounds of this invention will bring about an appreciable improvement in the resistance of the composition to attack by fungi and bacteria. Three percent or more of the biocidal compounds can be used, but these larger amounts ordinarily do not provide further improvement in the properties of the surface-coating compositions and for this reason are not usually used. The amount of the biocidal compound that will provide optimum protection for surface-coating compositions depends upon such factors as the choice of the biocidal compound, the choice of resinous binder and other ingredients of the composition and the amount of each of these materials that is used, and the application for which the coating composition is intended. In most cases 1 percent to 2 percent of an oxazolidine, based on the weight of the composition, is used to protect surface-coating compositions from attack by fungi. From 0.1 percent to 0.5 percent of the oxazolidines, based on the weight of the composition, is preferably incorporated into aqueous surface-coating compositions to protect them from attack by bacteria.

In addition to the resinous binder and the biocidal compound, the surface-coating compositions may contain various auxiliary materials, such as pigments, extenders, solvents, dyes, defoaming agents, driers, thickeners, emulsifiers, plasticizers, and the like in the amounts ordinarily used for these purposes.

The biocidal compounds may be incorporated into the surface-coating compositions by any convenient procedure. As has been indicated hereinbefore, aqueous solutions containing the oxazolidines can be mixed with the aqueous surface-coating composition. Alternatively, the biocidal compounds can be combined with the pigments and other components to form a pigment phase that is mixed with the resinous binder and water or organic solvent to form the surface-coating composition.

The invention is further illustrated by the following examples.

EXAMPLE 1

A. A polyvinyl acetate latex paint was prepared by mixing together the following materials:

|  | Parts by weight |
|---|---|
| Water | 481.5 |
| 25% aqueous solution of sodium salt of maleic anhydride/ diisobutylene copolymer | 24 |
| Potassium pyrophosphate | 3 |
| Long chain fatty acid alkanolamide | 9 |
| Defoamer | 6 |
| Ethylene glycol | 75 |
| 1¼% aqueous solution of hydroxyethylcellulose | 375 |
| Aqueous emulsion containing 55% of polyvinyl acetate | 1299 |
| Diethyl ether of diethylene glycol | 30 |
| Titanium dioxide | 690 |
| Talc | 345 |
| Calcium metasilicate | 150 |

This paint had the following properties as determined by standard paint testing procedures:

| Viscosity | 65 K.U. |
|---|---|
| Brookfield viscosity (No. 4 spindle, 60 rpm) | 800 cps. |
| pH | 7.8 |
| Yellowness index | 3.0 |

Small amounts of the biocidal compounds of this invention or comparative biocides were added to portions of this paint.

B. An acrylic latex paint was prepared by mixing together the following materials

| | Parts by weight |
|---|---|
| Water | 168 |
| Alkyl aryl ether surfactant | 6 |
| 25% aqueous solution of sodium salt of maleic anhydride/ diisobutylene copolymer | 27 |
| Defoamer | 12 |
| 2% aqueous solution of hydroxyethylcellulose | 300 |
| Ethylene glycol | 60 |
| Titanium dioxide | 750 |
| Mica (waterground) | 90 |
| Calcium carbonate | 375 |
| Ammonium hydroxide (28%) | 6 |
| Aqueous dispersion containing 46% acrylic ester copolymer (66% ethyl acrylate, 32.5% methyl acrylate, and 1.5% acrylic acid) | 1642 |

This paint had the following properties:

| | |
|---|---|
| Viscosity | 72 K.U. |
| Brookfield viscosity (No. 3 spindle, 60 rpm) (cps) | 1250 |
| pH | 9.2 |
| Yellowness index | 2.6 |

Small amounts of the biocidal compounds of this invention or comparative biocides were added to portions of this paint.

C. An exterior house paint was prepared by mixing together the following materials:

| | Parts by weight |
|---|---|
| Basic lead carbonate | 288 |
| Zinc oxide | 232 |
| Titanium dioxide (rutile) | 149 |
| Talc | 260 |
| Linseed oil | 242 |
| Bodied linseed oil | 114 |
| Mineral spirits | 114 |
| Antiskinning agent | 2 |
| Manganese naphthenate (6%) | 2.27 |
| Lead naphthenate (24%) | 11.3 |

Small amounts of the biocidal compounds of this invention or comparative biocides were added to portions of this paint.

D. The polyvinyl acetate latex paint, the acrylic latex paint, and the oil-based paint were evaluated by means of an agar diffusion assay. In this test, agar is inoculated with the test organism, the treated paint is placed in a well cut from the agar, and after incubation at 28°C. and 85–90 percent relative humidity, the activity of the biocide is measured by zones of inhibition. The biocidal compounds tested and the results obtained are given in Table I. In this table ZO = Zone of inhibited growth in mm.
0 = No zone of inhibition; no growth
Tr = Trace zone of inhibited growth
— = Not tested
Bacteria A — Mixed paint spoilage strains
B — *Pseudomonas aeruginosa*
C — *Aerobacter aerogenes*
Fungi D — *Pullularia pullulans*
E — *Penicillium crustosum*
F — *Aspergillus niger*

EXAMPLE 2

A series of the biocidal compounds of this invention were evaluated at the level of 2 percent in a polyvinyl acetate latex paint, an acrylic latex paint, and an oil-based paint by the procedure described in Example 1D. The results obtained are given in Table II.

EXAMPLE 3

A series of aqueous solutions of the biocides of this invention was prepared by mixing an aminoalcohol with a 37 percent aqueous formaldehyde solution at room temperature. The aminoalcohols used, the amounts of formaldehyde added, and the composition of the resulting solutions are given in Table III.

EXAMPLE 4 a. The aqueous solutions described in Example 3 were evaluated as biocides for paints by the procedure described in Example 1D. The results obtained are given in Table IV.

b. The paints containing the aqueous solutions of Example 3 were stored for 4 weeks at 120°F. and then evaluated. The results obtained, which are given in Table V, indicate that the solutions had lost little or none of their biocidal activity on storage.

Table I

Activity of Oxazolidines as Biocides in Paints

| Biocide (100% Active Material) | Paint | Test Level (%) | pH | Effect on Liquid Paint Odor | Color | Viscosity | Biocidal Activity Bacteria A | B | C | Fungi D | E | F |
|---|---|---|---|---|---|---|---|---|---|---|---|---|
| 4,4-Dimethyloxazolidine | PVA | 2 | 8.9 | None | None | None | ZO-13 | ZO-6 | ZO-7 | ZO-13 | ZO-9 | ZO-1 |
| | | 1 | 8.8 | " | " | " | ZO-13 | ZO-7 | ZO-7 | ZO-7 | ZO-6 | Tr |
| | | 0.5 | 8.5 | " | " | " | ZO-7 | ZO-6 | ZO-5 | ZO-3 | ZO-1 | Tr |
| | | 0.1 | 8.0 | " | " | " | ZO-2 | ZO-2 | ZO-1 | 0 | 0 | 0 |
| | Acrylic | 2 | 9.4 | " | " | Increased | ZO-16 | ZO-6 | ZO-7 | ZO-8 | ZO-7 | Tr |
| | | 1 | 9.2 | " | " | None | ZO-10 | ZO-4 | ZO-5 | ZO-3 | ZO-1 | Tr |
| | | 0.5 | 9.0 | " | " | " | ZO-1 | Tr | Tr | 0 | 0 | 0 |
| | | 0.1 | 8.8 | " | " | " | 0 | 0 | 0 | 0 | 0 | 0 |
| | Oil | 2 | — — | Slight | " | " | — — | — — | — — | ZO-12 | ZO-7 | ZO-2 |
| 4-Hydroxymethyl-4-methyloxazolidine | PVA | 2 | 7.9 | None | None | None | ZO-12 | ZO-6 | ZO-6 | ZO-13 | ZO-9 | ZO-2 |
| | | 1 | 7.9 | " | " | " | ZO-13 | ZO-6 | ZO-6 | ZO-9 | ZO-6 | ZO-1 |
| | | 0.5 | 7.7 | " | " | " | ZO-9 | ZO-4 | ZO-5 | ZO-6 | ZO-3 | Tr |
| | | 0.1 | 7.5 | " | " | " | ZO-2 | ZO-1 | Tr | Tr | Tr | 0 |
| | Acrylic | 2 | 8.4 | " | " | " | ZO-10 | ZO-5 | ZO-6 | ZO-12 | ZO-10 | Tr |
| | | 1 | 8.5 | " | " | " | ZO-10 | ZO-6 | ZO-6 | ZO-9 | ZO-5 | Tr |
| | | 0.5 | 8.4 | " | " | " | ZO-7 | ZO-2 | Tr | 0 | 0 | 0 |
| | | 0.1 | 8.4 | " | " | " | ZO-1 | 0 | 0 | 0 | 0 | 0 |
| | Oil | 2 | — — | " | " | " | — — | — — | — — | ZO-12 | ZO-7 | ZO-3 |

Table I (Continued)

| Biocide (100% Active Material) | Paint | Test Level (%) | pH | Effect on Liquid Paint Odor | Color | Viscosity | Biocidal Activity Bacteria A | B | C | Fungi D | E | F |
|---|---|---|---|---|---|---|---|---|---|---|---|---|
| 4,4-Bis(hydroxymethyl) oxazolidine | PVA | 2 | 8.2 | None | None | None | ZO-4 | ZO-2 | ZO-2 | ZO-6 | ZO-4 | 0 |
| | | 1 | 8.2 | " | " | " | ZO-7 | Tr | ZO-1 | 0 | 0 | 0 |
| | | 0.5 | 8.0 | " | " | " | ZO-2 | Tr | Tr | 0 | 0 | 0 |
| | | 0.1 | 7.5 | " | " | " | Tr | 0 | 0 | 0 | 0 | 0 |
| | Acrylic | 2 | 8.7 | " | " | " | ZO-9 | ZO-2 | ZO-1 | Tr | Tr | 0 |
| | | 1 | 8.7 | " | " | " | ZO-8 | Tr | Tr | 0 | 0 | 0 |
| | | 0.5 | 8.6 | " | " | " | ZO-5 | Tr | Tr | 0 | 0 | 0 |
| | | 0.1 | 8.5 | " | " | " | 0 | 0 | 0 | 0 | 0 | 0 |
| | Oil | 2 | -- | " | " | " | -- | -- | -- | ZO-2 | Tr | 0 |
| 5-Methyl-1-aza-3,7-dioxabicyclo(3,3,0) octane | PVA | 2 | 7.7 | None | None | None | ZO-13 | ZO-9 | ZO-15 | ZO-13 | ZO-11 | ZO-2 |
| | Acrylic | 2 | 8.3 | " | " | " | ZO-10 | ZO-8 | ZO-14 | ZO-12 | ZO-8 | ZO-2 |
| | Oil | 2 | -- | " | " | " | -- | -- | -- | ZO-10 | ZO-8 | ZO-4 |
| 3-Hydroxymethyl-4,4-dimethyloxazolidine | PVA | 2 | 8.4 | None | None | None | ZO-16 | ZO-10 | ZO-10 | ZO-12 | ZO-10 | ZO-2 |
| | | 1 | 8.4 | " | " | " | ZO-13 | ZO-8 | ZO-9 | ZO-10 | ZO-8 | ZO-1 |
| | | 0.5 | 8.3 | " | " | " | ZO-10 | ZO-7 | ZO-8 | ZO-7 | ZO-6 | 0 |
| | | 0.1 | 7.7 | " | " | " | ZO-5 | ZO-2 | ZO-1 | 0 | 0 | 0 |
| | Acrylic | 2 | 8.7 | " | " | " | ZO-17 | ZO-10 | ZO-16 | ZO-10 | ZO-8 | ZO-1 |
| | | 1 | 8.5 | " | " | " | ZO-12 | ZO-8 | ZO-8 | ZO-2 | Tr | 0 |
| | | 0.5 | 8.4 | " | " | " | ZO-4 | ZO-1 | Tr | 0 | 0 | 0 |
| | | 0.1 | 8.4 | " | " | " | Tr | 0 | 0 | 0 | 0 | 0 |
| | Oil | 2 | -- | " | " | " | -- | -- | -- | ZO-12 | ZO-9 | ZO-3 |

Table II

Activity of Substituted Oxazolidines at 2% Level as Biocides in Paints

| Ex. No. | Biocide (100% Active Material) | Paint | pH | Effect on Liquid Paint Odor | Color | Viscosity | Biocidal Activity Bacteria A | B | C | Fungi D | E | F |
|---|---|---|---|---|---|---|---|---|---|---|---|---|
| 2A | 2-Phenyl-4-hydroxymethyl-4-methyl-oxazolidine | PVA | 7.7 | Slight | None | None | ZO-17 | ZO-8 | ZO-13 | ZO-7 | ZO-5 | ZO-1 |
| | | Acrylic | 8.8 | " | " | " | ZO-13 | ZO-5 | ZO-10 | Tr | Tr | Tr |
| | | Oil | -- | None | " | " | -- | -- | -- | ZO-5 | ZO-5 | Tr |
| 2B | 2-p-Chlorophenyl-4-hydroxymethyl-4-methyloxazolidine | PVA | 7.7 | None | None | None | ZO-15 | ZO-7 | ZO-10 | ZO-15 | ZO-4 | ZO-1 |
| | | Acrylic | 9.0 | " | " | " | ZO-13 | ZO-4 | ZO-7 | ZO-15 | ZO-1 | Tr |
| | | Oil | -- | " | " | " | -- | -- | -- | ZO-5 | ZO-3 | ZO-2 |
| 2C | 2-Formyl-4,4-dimethyl-oxazolidine | PVA | 8.6 | Slight | None | None | 0 | 0 | 0 | 0 | 0 | 0 |
| | | Acrylic | 9.4 | Moderate | " | " | 0 | 0 | 0 | 0 | 0 | 0 |
| | | Oil | -- | None | " | " | -- | -- | -- | 0 | 0 | 0 |
| 2D | 2-Phenyl-5-hydroxymethyl-1-aza-3,7-dioxabicyclo(3,3,0)octane | PVA | 8.0 | Slight | None | None | ZO-12 | ZO-4 | ZO-7 | 0 | 0 | 0 |
| | | Acrylic | 9.4 | " | " | " | ZO-7 | ZO-1 | ZO-5 | 0 | 0 | 0 |
| | | Oil | -- | None | " | " | -- | -- | -- | Tr | 0 | 0 |
| 2E | 2-(2-Ethylbutyl)-5-methyl-1-aza-3,7-dioxabicyclo(3,3,0)octane | PVA | 8.5 | Moderate | None | None | ZO-13 | ZO-6 | ZO-9 | ZO-8 | ZO-4 | ZO-2 |
| | | Acrylic | 9.2 | " | " | " | ZO-10 | ZO-3 | ZO-8 | ZO-1 | ZO-1 | Tr |
| | | Oil | -- | Slight | " | " | -- | -- | -- | Tr | ZO-2 | ZO-4 |
| 2F | 2-(α-Chloroethyl)-5-methyl-1-aza-3,7-dioxabicyclo(3,3,0)octane | PVA | 6.2 | None | Brown | None | ZO-7 | ZO-3 | ZO-2 | 0 | 0 | 0 |
| | | Acrylic | 7.8 | " | Beige | " | ZO-2 | Tr | Tr | 0 | 0 | 0 |
| | | Oil | -- | " | None | " | -- | -- | -- | 0 | 0 | 0 |

Table II (Continued)

| Ex. No. | Biocide (100% Active Material) | Paint | Effect on Liquid Paint pH | Odor | Color | Viscosity | Biocidal Activity Bacteria A | B | C | Fungi D | E | F |
|---|---|---|---|---|---|---|---|---|---|---|---|---|
| 2G | 2-Phenyl-5-ethyl-1-aza-3,7-dioxabicyclo(3,3,0)octane | PVA Acrylic Oil | 7.9 9.0 - - | Slight " None | None " " | None " " | 0 0 -- | 0 0 -- | 0 0 -- | 0 0 0 | 0 0 0 | 0 0 0 |
| 2H | 2-o-Chlorophenyl-5-methyl-1-aza-3,7-dioxabicyclo(3,3,0)octane | PVA Acrylic Oil | 7.9 9.0 - - | Moderate Slight None | None " " | None " " | ZO-8 ZO-5 -- | ZO-5 ZO-2 -- | ZO-4 ZO-3 -- | 0 Tr Tr | 0 Tr Tr | 0 Tr Tr |
| 2I | 2-p-chlorophenyl-5-methyl-1-aza-3,7-dioxabicyclo(3,3,0)octane | PVA Acrylic Oil | 8.1 9.4 - - | Slight " None | None " " | None " " | ZO-7 ZO-8 -- | ZO-4 ZO-3 -- | ZO-4 ZO-5 -- | Tr Tr Tr | Tr ZO-1 ZO-1 | 0 Tr Tr |
| Comp. Ex. A | S-13 (Dow Chemical Co.) | PVA Acrylic Oil | 7.5 9.1 - - | None " " | None " " | None " " | ZO-13 ZO-13 -- | 0 0 -- | 0 0 -- | ZO-14 ZO-10 ZO-20 | ZO-19 ZO-11 ZO-10 | ZO-12 ZO-5 ZO-6 |
| B | Bis(phenylmercuric) dodecenyl succinate (Super Ad-it) | PVA Acrylic Oil | 7.0 9.0 - - | None " " | None " " | None " " | ZO-19 ZO-17 -- | ZO-11 ZO-13 -- | ZO-9 ZO-8 -- | ZO-13 ZO-10 ZO-17 | ZO-10 ZO-3 ZO-6 | ZO-15 ZO-10 ZO-14 |
| C | None | PVA Acrylic Oil | 7.5 9.3 - - | None " " | None " " | None " " | 0 0 -- | 0 0 -- | 0 0 -- | 0 0 0 | 0 0 0 | 0 0 0 |

Table III

| Ex. No. | Aminoalcohol | Moles Formaldehyde per mole Aminoalcohol | Analysis % Water (Karl Fischer Method) | % Solids | Oxazolidine Compound(s) in the Solution* | pH of 0.1 M Solution |
|---|---|---|---|---|---|---|
| 3A | Trimethylolaminomethane | 1.0 | 55.4 | 44.6 | 4,4-Bis(hydroxymethyl)oxazolidine | 10.1 |
| 3B | Trimethylolaminomethane | 2.0 | 48.8 | 51.2 | 5-Hydroxymethyl-1-aza-3,7-dioxabicyclo(3,3,0)octane | 7.7 |
| 3C | Trimethylolaminomethane | 3.0 | 52.3 | 47.7 | 54% 5-Hydroxymethyl-1-aza-3,7-dioxabicyclo(3,3,0)octane 19% 5-Hydroxymethoxymethyl-1-aza-3,7-dioxabicyclo(3,3,0)octane 27% 2,5-Bis(hydroxymethyl)-1-aza-3,7-dioxabicyclo(3,3,0)octane | 6.2 |
| 3D | Trimethylolaminomethane | 4.0 | 54.8 | 45.2 | 38% 5-Hydroxymethyl-1-aza-3,7-dioxabicyclo(3,3,0)octane 29% 5-Hydroxymethoxymethyl-1-aza-3,7-dioxabicyclo(3,3,0)octane 33% 2,5-Bis(hydroxymethyl)-1-aza-3,7-dioxabicyclo(3,3,0)octane | 5.9 |
| 3E | 2-Amino-2-methyl propanol-1 | 1.0 | 39.15 | 60.85 | 82% 4,4-Dimethyloxazolidine 11% 3-Hydroxymethyl-4,4-dimethyloxazolidine 7% Closely-related cyclic compounds | 10.95 |
| 3F | 2-Amino-2-methyl-propanol-1 | 2.0 | 48.8 | 51.2 | 11% 4,4-Dimethyloxazolidine 46% 3-Hydroxymethyl-4,4-dimethyloxazolidine 43% Closely-related cyclic compounds | 10.3 |
| 3G | 2-Amino-2-methyl-1,3-propanediol | 1.0 | 39.6 | 60.4 | 4-Hydroxymethyl-4-methyloxazolidine | 10.6 |
| 3H | 2-Amino-2-methyl-1,3-propanediol | 2.0 | 53.2 | 46.8 | 5-Methyl-1-aza-3,7-dioxabicyclo(3,3,0)octane | 9.5 |

*Determined by NMR

Table IV

Activity of Aqueous Solution of
Oxazolidines as Biocides in Paints

| Ex. No. | Paint | Test Level (%) | Effect on Liquid Paint | | | | Biocidal Activity | | | | | |
| --- | --- | --- | --- | --- | --- | --- | --- | --- | --- | --- | --- | --- |
| | | | | | | | Bacteria | | | Fungi | | |
| | | | pH | Odor | Color | Viscosity | A | B | C | D | E | F |
| 3A | PVA | 2 | 8.0 | None | None | None | ZO-3 | ZO-1 | 0 | 0 | 0 | 0 |
| | Acrylic | 2 | 8.9 | " | " | " | ZO-10 | 0 | 0 | 0 | 0 | 0 |
| | Oil | 2 | -- | " | " | " | -- | -- | -- | 0 | 0 | 0 |
| 3B | PVA | 2 | 7.5 | None | None | None | ZO-3 | ZO-4 | ZO-1 | ZO-4 | ZO-2 | 0 |
| | Acrylic | 2 | 8.4 | " | " | " | ZO-11 | ZO-3 | ZO-4 | ZO-6 | 0 | 0 |
| | Oil | 2 | -- | " | " | " | -- | -- | -- | 0 | Tr | 0 |
| 3C | PVA | 2 | 7.4 | None | None | None | ZO-9 | ZO-6 | ZO-3 | ZO-5 | ZO-4 | 0 |
| | Acrylic | 2 | 7.6 | " | " | " | ZO-12 | ZO-4 | ZO-1 | ZO-5 | Tr | 0 |
| | Oil | 2 | -- | " | " | " | -- | -- | -- | 0 | Tr | 0 |
| 3D | PVA | 2 | 7.3 | None | None | None | ZO-10 | ZO-8 | ZO-5 | ZO-6 | ZO-6 | 0 |
| | Acrylic | 2 | 7.5 | " | " | " | ZO-12 | ZO-4 | ZO-3 | ZO-6 | ZO-2 | 0 |
| | Oil | 2 | -- | " | " | " | -- | -- | -- | Tr | ZO-2 | 0 |
| 3E | PVA | 2 | 8.9 | None | None | None | ZO-10 | ZO-6 | ZO-4 | ZO-1 | ZO-1 | 0 |
| | Acrylic | 2 | 8.4 | " | " | " | ZO-10 | ZO-3 | ZO-3 | ZO-1 | 0 | 0 |
| | Oil | 2 | -- | " | " | " | -- | -- | -- | ZO-5 | ZO-2 | 0 |
| 3F | PVA | 2 | 8.5 | None | None | None | ZO-12 | ZO-8 | ZO-4 | 0 | ZO-2 | 0 |
| | Acrylic | 2 | 8.8 | " | " | " | ZO-12 | ZO-5 | ZO-6 | ZO-5 | ZO-1 | 0 |
| | Oil | 2 | -- | " | " | " | -- | -- | -- | ZO-3 | Tr | 0 |
| 3G | PVA | 2 | 8.4 | None | None | None | ZO-8 | ZO-4 | ZO-7 | ZO-7 | ZO-5 | Tr |
| | | 1 | 7.9 | " | " | " | ZO-9 | ZO-4 | ZO-6 | ZO-4 | ZO-3 | Tr |
| | | 0.5 | 7.4 | " | " | " | ZO-7 | Tr | ZO-1 | Tr | Tr | 0 |
| | | 0.1 | 7.4 | " | " | " | ZO-2 | 0 | Tr | 0 | 0 | 0 |
| | Acrylic | 2 | 9.3 | " | " | " | ZO-8 | ZO-4 | ZO-7 | ZO-4 | ZO-3 | Tr |
| | | 1 | 8.8 | " | " | " | ZO-4 | ZO-2 | ZO-2 | 0 | 0 | 0 |
| | | 0.5 | 8.9 | " | " | " | Tr | Tr | Tr | 0 | 0 | 0 |
| | | 0.1 | 8.5 | " | " | " | Tr | 0 | 0 | 0 | 0 | 0 |
| | Oil | 2 | -- | " | " | " | -- | -- | -- | ZO-5 | ZO-3 | Tr |
| | | 1 | -- | " | " | " | -- | -- | -- | ZO-5 | ZO-1 | Tr |
| | | 0.5 | -- | " | " | " | -- | -- | -- | Tr | Tr | 0 |
| | | 0.1 | -- | " | " | " | -- | -- | -- | 0 | 0 | 0 |
| 3H | PVA | 2 | 7.5 | None | None | None | ZO-12 | ZO-7 | ZO-8 | ZO-9 | ZO-6 | Tr |
| | | 1 | 7.5 | " | " | " | ZO-11 | ZO-4 | ZO-6 | ZO-7 | ZO-3 | Tr |
| | | 0.5 | 7.5 | " | " | " | ZO-9 | ZO-4 | ZO-3 | ZO-2 | ZO-1 | Tr |
| | | 0.1 | 7.5 | " | " | " | ZO-2 | ZO-1 | ZO-1 | Tr | Tr | 0 |
| | Acrylic | 2 | 8.4 | " | " | Gelled | ZO-12 | ZO-7 | ZO-8 | ZO-5 | ZO-6 | Tr |
| | | 1 | 8.5 | " | " | None | ZO-8 | ZO-3 | ZO-2 | Tr | Tr | Tr |
| | | 0.5 | 8.6 | " | " | " | ZO-2 | Tr | Tr | 0 | 0 | 0 |
| | | 0.1 | 8.6 | " | " | " | Tr | 0 | 0 | 0 | 0 | 0 |
| | Oil | 2 | -- | " | " | " | -- | -- | -- | ZO-7 | ZO-3 | Tr |
| | | 1 | -- | " | " | " | -- | -- | -- | ZO-4 | ZO-1 | Tr |
| | | 0.5 | -- | " | " | " | -- | -- | -- | Tr | Tr | 0 |
| | | 0.1 | -- | " | " | " | -- | -- | -- | 0 | 0 | 0 |

Table V

Activity of Aqueous Solutions of Oxazolidines as Biocides
in Paints After Four Weeks Storage at 120°F.

| Ex. No. | Paint | Test Level (%) | Effect on Liquid Paint pH | Odor | Color | Viscosity | Biocidal Activity Bacteria A | B | C | Fungi D | E | F |
|---|---|---|---|---|---|---|---|---|---|---|---|---|
| 3B | PVA | 2 | 6.5 | None | None | None | ZO-10 | ZO-1 | ZO-3 | ZO-9 | ZO-6 | Tr |
|  | Acrylic | 2 | 8.3 | " | " | " | -- | -- | -- | -- | -- | -- |
|  | Oil | 2 | -- | " | " | " | -- | -- | -- | -- | -- | -- |
| 3C | PVA | 2 | 6.3 | None | None | None | ZO-12 | ZO-5 | ZO-6 | ZO-10 | ZO-7 | Tr |
|  | Acrylic | 2 | 8.0 | " | " | Increased | -- | -- | -- | -- | -- | -- |
|  | Oil | 2 | -- | " | " | None | -- | -- | -- | -- | -- | -- |
| 3D | PVA | 2 | 6.2 | None | None | None | ZO-14 | ZO-5 | ZO-6 | ZO-12 | ZO-9 | Tr |
|  | Acrylic | 2 | 7.8 | " | " | " | ZO-10 | ZO-2 | ZO-4 | ZO-10 | ZO-6 | Tr |
|  | Oil | 2 | -- | " | " | " | -- | -- | -- | Tr | Tr | 0 |
| 3E | PVA | 2 | 7.9 | None | None | None | ZO-8 | ZO-6 | ZO-3 | ZO-8 | ZO-5 | Tr |
|  | Acrylic | 2 | 9.2 | " | " | " | ZO-7 | ZO-3 | ZO-2 | ZO-3 | ZO-3 | Tr |
|  | Oil | 2 | -- | " | " | " | -- | -- | -- | 0 | 0 | 0 |
| 3F | PVA | 2 | 7.3 | None | None | None | ZO-9 | ZO-5 | ZO-6 | ZO-9 | ZO-7 | Tr |
|  | Acrylic | 2 | 8.7 | " | " | " | ZO-6 | ZO-5 | ZO-5 | ZO-7 | ZO-5 | Tr |
|  | Oil. | 2 | -- | " | " | " | -- | -- | -- | 0 | 0 | 0 |

EXAMPLE 5

To portions of the polyvinyl acetate latex paint whose preparation is described in Example 1A were added small amounts of the aqueous biocidal solutions whose preparation is described in Example 3. The resulting treated paints were evaluated by the following procedure:

A mixed bacterial inoculum consisting of *Pseudomonas aeruginosa* ATCC 10145, *Aerobacter aerogenes* ATCC 7256, *Bacillus subtilis*, *Bacillus megsterium* and *Bacillus licheniformis* was prepared by incubation of inoculated (0.5 ml.) milk dilution bottles containing 50 ml. of solidified Trypticase-Soy Agar.

After incubation for 18 to 24 hours at 35°C., the cultures were removed from the agar surface, diluted to an appropriate volume in phosphate buffer (0.05 M, pH 7.0), and inoculated into 300 gram portions of the test paints. The amount of the culture added to the paint was such that the final level of bacteria was between 0.5 × 10⁶ and 3 × 10⁶ per gram of paint. After thorough mixing, the paints were incubated at 35°C. under 90 percent relative humidity. At intervals during the incubation, measurements of viability of the bacteria and viscosity of the paint were made. The viability test was carried out by adding an aliquot of the paint to Trypticase-Soy Broth, incubating for 48 hours at 35°C., and then streaking it on a Trypticase-Soy Agar plate. After a 24 hour incubation period at 35°C., the plates were examined for growth along the streak. The results obtained are reported in Table VI as + (growth present) or − (growth absent). The viscosity of the paint samples was measured with a Brookfield Viscometer using a No. 3 spindle at 60 rpm. The percentage decrease of the viscosity of each of the treated paints during the incubation period is reported in Table VI.

Table VI

Aqueous Solutions of Oxazolidines as Preservatives
for Polyvinyl Acetate Latex Paint

| Ex. No. | Biocide | Concentration of Biocide (%)* | Viability** Incubation Period (Days) 1 | 2 | 5 | 9 | 21 | % Total Decrease in Viscosity - Incubation Period (Days) 7 | 14 | 21 |
|---|---|---|---|---|---|---|---|---|---|---|
| 5A | Solution of Ex. 3C | 0.25 | + | + | − | − | − | 19 | 20 | 20 |
|  |  | 0.10 | + | + | − | − | − | 19 | 20 | 22 |
| 5B | Solution of Ex. 3D | 0.25 | + | − | − | − | − | 14 | 11 | 11 |
|  |  | 0.10 | + | + | − | − | − | 18 | 18 | 7 |

Table VI — Continued

Aqueous Solutions of Oxazolidines as Preservatives for Polyvinyl Acetate Latex Paint

| Ex. No. | Biocide | Concentration of Biocide (%)* | Viability** Incubation Period (Days) | | | | | % Total Decrease in Viscosity - Incubation Period (Days) | | |
|---|---|---|---|---|---|---|---|---|---|---|
| | | | 1 | 2 | 5 | 9 | 21 | 7 | 14 | 21 |
| 5C | Solution of Ex. 3E | 0.25 | + | − | − | − | − | 14 | 10 | 5 |
| | | 0.10 | + | + | − | − | − | 17 | 11 | 9 |
| 5D | Solution of Ex. 3F | 0.25 | + | − | − | − | − | 14 | 15 | 6 |
| | | 0.10 | + | + | + | − | − | 14 | 11 | 10 |
| Comp. Ex. D | Phenylmercuric acetate | 0.05 | + | + | − | − | − | 16 | 17 | 17 |
| Comp. Ex. E | None | ---- | + | + | + | + | + | 25 | 29 | 33 |

*Levels based on 100% active compound
**Viability Responses: + = growth on recovery media
− = no growth on recovery media Each of the other oxazolidines disclosed herein can be used in a similar way to protect surface-coating compositions from attack by bacteria and fungi.

What is claimed is:

1. A surface-coating composition having improved resistance to attack by bacteria and fungi that comprises
    a. a water-insoluble, film-forming resinous binder selected from the group consisting of synthetic linear addition polymers prepared by the emulsion polymerization of ethylenically-unsaturated monomers, oleoresinous binders, and mixtures thereof, and
    b. 0.10 percent to 3.0 percent, based on the weight of the composition, of a biocidal component selected from the group consisting of
        i. compounds having the structural formula

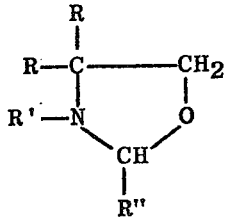

ii. compounds having the structural formula

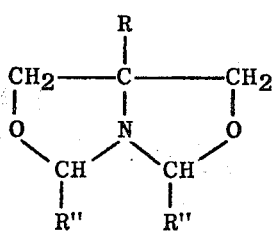

wherein each R represents alkyl of 1 to 6 carbon atoms, hydroxymethyl, or hydroxymethoxymethyl;

R' represents hydrogen, alkyl of 1 to 6 carbon atoms, phenyl, halophenyl, or hydroxymethyl;

each R'' represents hydrogen, alkyl of 1 to 6 carbon atoms, chloroalkyl of 1 to 4 carbon atoms, phenyl, halophenyl, hydroxymethyl, or $-(CH_2)_n CHO$; and $n$ represents 0 to 3; and iii. mixtures thereof.

2. A surface-coating composition as defined in claim 1 that comprises an aqueous composition that contains about 10 percent to 60 percent by weight of a synthetic linear addition polymer prepared by the emulsion polymerization of ethylenically-unsaturated monomers.

3. A surface-coating composition as defined in claim 2 wherein the synthetic linear addition polymer is polyvinyl acetate.

4. A surface-coating composition as defined in claim 2 wherein the synthetic linear addition polymer is an acrylate polymer.

5. A surface-coating composition as defined in claim 2 that contains 0.1 percent to 0.5 percent of said biocidal component.

6. A surface-coating composition as defined in claim 1 wherein the biocidal component comprises 4,4-dimethyloxazolidine.

7. A surface-coating composition as defined in claim 1 wherein the biocidal component comprises 5-hydroxymethyl-1-aza-3,7-dioxabicyclo (3,3,0)octane.

8. A surface-coating composition as defined in claim 1 wherein the biocidal component comprises 5-methyl-1-aza-3,7-dioxabicyclo(3,3,0)octane.

9. A surface-coating composition as defined in claim 1 wherein the biocidal component comprises 4-hydroxymethyl-4-methyloxazolidine.

10. A surface-coating composition as defined in claim 1 wherein the biocidal component comprises 3-hydroxymethyl-4,4-dimethyloxazolidine.

11. A surface-coating composition as defined in claim 2 wherein the biocidal component is a mixture containing 5-hydroxymethyl-1-aza-3,7-dioxabicyclo(3,3,0)octane, 5-hydroxymethoxymethyl-1-aza-3,7-dioxabicyclo(3,3,0)octane, and 2,5-bis(hydroxymethyl)-1-aza-3,7-dioxabicyclo(3,3,0)octane.

12. A surface-coating composition as defined in claim 2 wherein the biocidal component is a mixture comprising 4,4-dimethyloxazolidine and 3-hydroxymethyl-4,4-dimethyloxazolidine.

13. The method of controlling the growth of fungi and bacteria in a surface-coating composition that comprises a water-insoluble, film-forming, resinous binder selected from the group consisting of synthetic linear addition polymers prepared by the emulsion polymerization of ethylenically-unsaturated monomers, oleoresinous binders, and mixtures thereof that comprises incorporating in said composition 0.1 percent to 3.0 percent, based on the weight of said composition, of a biocidal component selected from the group consisting of a. compounds having the structural formula

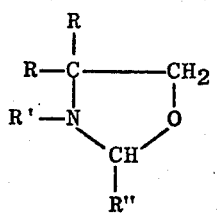

b. compounds having the structural formula

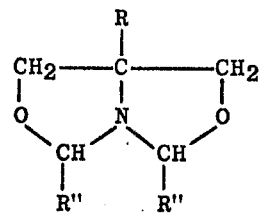

wherein each R represents alkyl of 1 to 6 carbon atoms, hydroxymethyl, or hydroxymethoxymethyl;

R' represents hydrogen, alkyl of 1 to 6 carbon atoms, phenyl, halophenyl, or hydroxymethyl;

each R'' represents hydrogen, alkyl of 1 to 6 carbon atoms, chloroalkyl of 1 to 4 carbon atoms, phenyl, halophenyl, $-(CH_2)_n CHO$, or hydroxymethyl;

$n$ represents 0 to 3; and c. mixtures thereof.

14. The method of claim 13 wherein the surface-coating composition comprises an aqueous composition that contains about 10 percent to 60 percent by weight of a synthetic linear addition polymer prepared by the emulsion polymerization of ethylenically-unsaturated monomers.

15. The method of claim 14 wherein 0.1 percent to 0.5 percent of the biocidal component is incorporated into the aqueous surface-coating composition.

16. The method of claim 14 wherein the biocidal component is added as an aqueous solution that contains 20 percent to 80 percent by weight of said biocidal component.

17. The method of claim 14 wherein the biocidal component is added as an aqueous solution that contains 40 percent to 60 percent by weight of said biocidal component.

* * * * *